June 20, 1967 H. E. M. BRADLEY 3,326,325
APPARATUS FOR TRANSMITTING INFORMATION PARTICULARLY
FOR USE IN THE OPERATION OF A SELF-SERVICE STORE
Filed Dec. 1, 1964 3 Sheets-Sheet 1
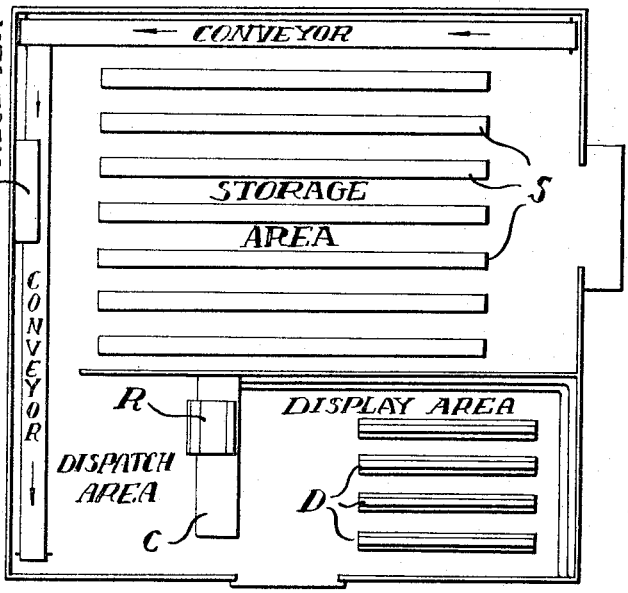
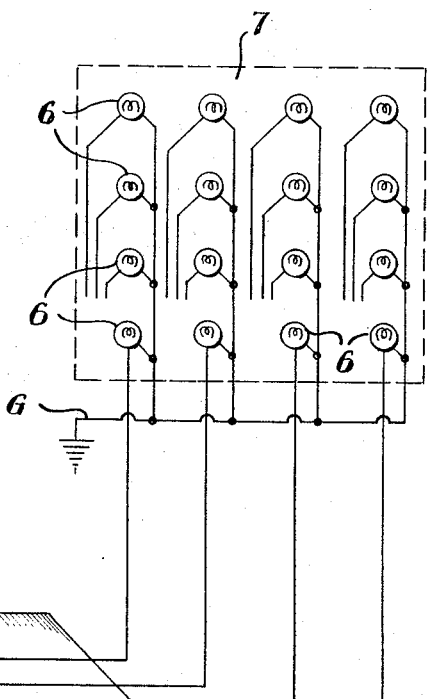
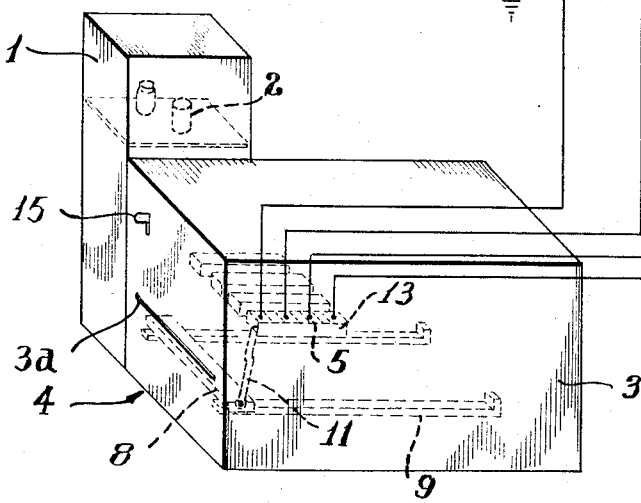
Inventor:
Henry Edward Manning Bradley
BY: Baldwin & Wight
Attorneys

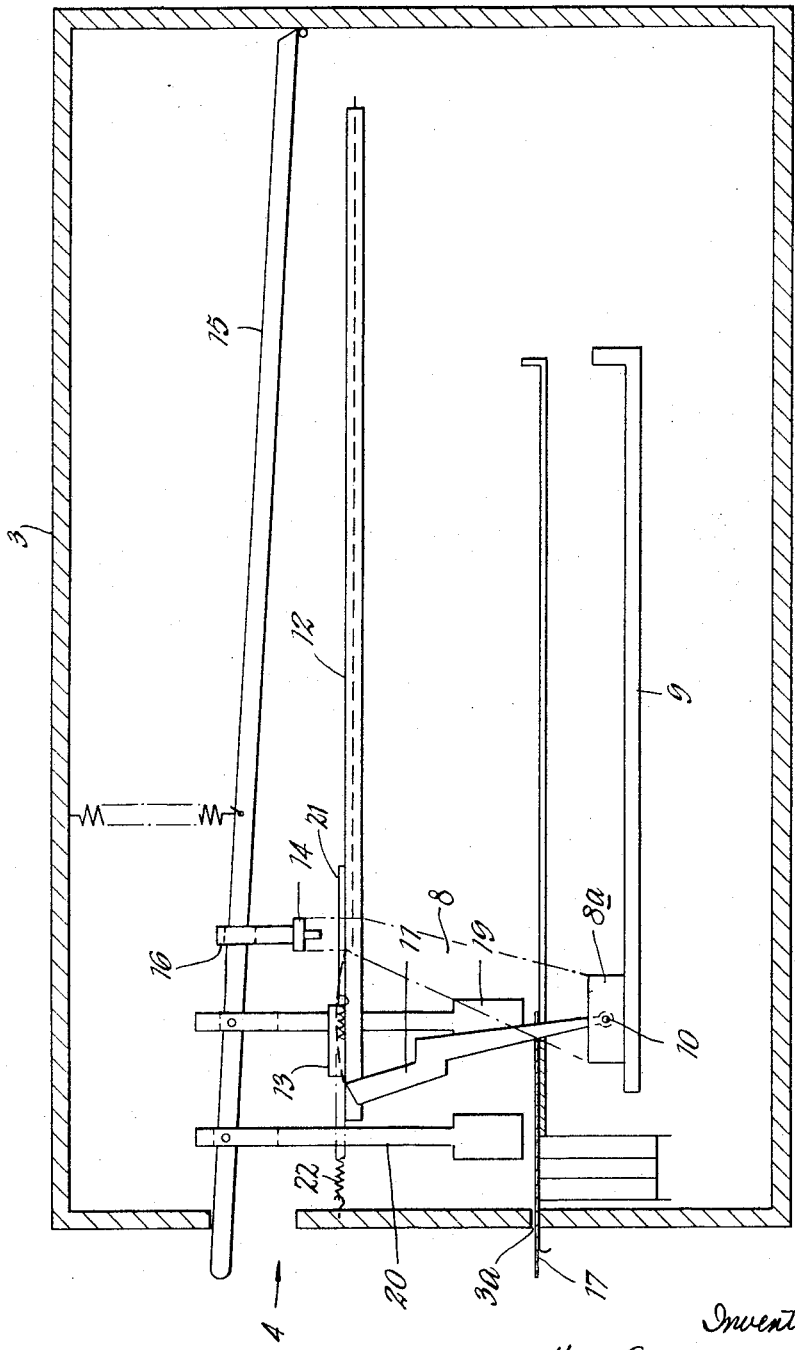

June 20, 1967   H. E. M. BRADLEY   3,326,325
APPARATUS FOR TRANSMITTING INFORMATION PARTICULARLY
FOR USE IN THE OPERATION OF A SELF-SERVICE STORE
Filed Dec. 1, 1964   3 Sheets-Sheet 3

Inventor:
Henry Edward Manning Bradley
By Baldwin & Wight
Attorneys

United States Patent Office 3,326,325
Patented June 20, 1967

3,326,325
APPARATUS FOR TRANSMITTING INFORMATION PARTICULARLY FOR USE IN THE OPERATION OF A SELF-SERVICE STORE
Henry Edward Manning Bradley, 14 Mespil House, Sussex Road, Dublin, Ireland
Filed Dec. 1, 1964, Ser. No. 415,210
13 Claims. (Cl. 186—1)

This invention relates generally to a method of, and apparatus for, automatically conveying or transmitting to a storage station, containing a plurality of similar and/or dissimilar objects or articles, information regarding the distribution to, and/or assembly at, a given dispatching station of any one or more of said objects or articles from a remotely located centre containing particulars or samples of each of said objects or articles, the transmission of which information is under the unrestricted control of a person at said centre. More particularly, but not exclusively, the invention is concerned with a method of operating a self-service retail store, such as that now commonly known as a "Supermarket."

At the present time, the self-service type of retail store involves the provision on a plurality of shelves or in storage compartments in the store of a large number of each article on sale, such as jars of preserves, tins of fruit, all kinds of household articles, cheeses, egg cartons, and other merchandise commonly offered for sale in a normal grocery or food store. In the operation of such a store, a customer wishing to make purchases, moves from shelf to shelf or compartment to compartment, either carrying a basket or pushing a trolley, and takes from one or more of said shelves or compartments the article or articles required and places it or them in the basket or trolley. After completing his or her purchase in this manner, the customer than proceeds with the basket or trolley to any one of a number of cash desks where the total cost of the articles is assessed by an assistant with the aid of an adding machine, whereupon the customer pays the amount involved to the assistant and departs with the goods purchased.

Whilst such a method of operation is, in some respects, advantageous compared with the normal personal or assistant service method of trading, it, nevertheless, suffers from a number of serious disadvantages. In the first place, as will be readily appreciated, the need to maintain an adequate supply of any given article of merchandise on sale, to meet the requirements of daily customers, involves the continual replacement of such articles as they are removed by customers, and, therefore, not only must a continuous watch be kept on the various shelves or compartments to prevent undue depletion thereof at any given time, but a very large reserve supply of each article must be maintained in the stock room, which articles have to be continually manually transferred from the stockroom to the store during the hours of business if customers are not to be disappointed by finding that any particular article they require is not available when required.

This necessary constant supervision and replacement involves the employment of a large number of persons, frequently in excess of that required in normal personal service stores, and may be an uneconomic proposition except for undertakings having a very large daily turnover.

Moreover, whilst the main purpose of the self-service system is to facilitate and speed up the making of purchases by customers, this desirable end is frequently frustrated, particularly in cases where a large number of customers has each made considerable purchases at substantially the same time, by the inevitable queues which unavoidably develop at the cash desks owing to the assistant having to add up the cost of each customer's purchases item by item. This frequently causes prolonged delays and is exasperating to the customers.

The object of this invention is to overcome the above disadvantage and to provide a simplified method, applicable especially to the operation of a self-service store, whereby any one or more of a number of similar or dissimilar articles housed in a storage station may be selected by a person at a point remote from said storage station and information automatically passed by the said person to said storage station designed to cause the manual or automatic transfer of said selected article or articles from said storage station to a dispatching station for subsequent collection or for any other purpose.

According to the invention, there is provided a method of automatically conveying or transmitting to a storage station, housing a plurality of similar and/or dissimilar objects or articles, information regarding the distribution to, and/or assembly at, a given dispatching station of any one or more of said objects or articles from an adjacent or remotely located display centre containing particulars or samples of said objects or articles, which method comprises providing at said display centre a plurality of separate information-transmitting mechanisms, each of which is associated with an indication, such as a sample or a display card, of one, or of one type of, article housed in the storage station, and each information-transmitting mechanism comprising a housing containing a plurality of pivoted lever arms, each arm being operatively associated with indicating mechanism at the storage station and said arms being operable by the slotted edge of a number-carrying card or the like manually inserted into said housing to cause an indication determined by the arrangement of said slotted edge, to be given at the storage station that a particular numbered card has been inserted into a particular article-associated transmitting mechanism. Preferably, each lever arm is operatively associated with a predetermined number of operating members, each operatively connected with the indicating mechanism whereby, on the insertion of a card into the said housing a predetermined operating member associated with each lever arm, depending on the slot arrangement on said card, will be moved to a predetermined operative position, whereby the required indication will be given at the storage station to enable the corresponding article to be automatically or manually selected from the store and transferred to the receiving station corresponding to the number indicated at said storage station.

Means is also provided, preferably operable simultaneously with the actuation of a transmitting mechanism, for stamping on the inserted card particulars of the article selected and preferably also the price thereof.

The operating members are preferably in the form of metallic contacts electrically connected to an electrically controlled indicating mechanism at the storage station.

The pivoted lever arms and associated operating members or contacts may be slidably mounted as a unit in the housing to allow of insertion of a card to varying extents within the housing, depending on the number of items recorded on the card.

The actuation of the lever arms to bring the requisite operating members or contacts, into operative position, is preferably effected by forming the slotted edge of the card with a plurality of spaced slots cut to varying depths in the said edge of the card, the depth and number of which slots are determined by a particular number indicated on the card and with which slots the lever arms engage when the card is inserted into the housing.

The indicating mechanism at the storage station preferably comprises a panel carrying a plurality of groups of lamps, the number of groups corresponding to the number of information transmitting mechanisms at the information centre. Each group consists of a plurality of rows of lamps, the number of rows corresponding to the number of lever arms in the pertaining transmitting mechanism and the number of lamps in each row corresponding to the number of operating members or contacts associated wtih each lever arm. Each contact is electrically connected to one lamp of its pertaining group, those associated with any one lever arm being connected to lamps in the same row.

In addition to the various transmitting mechanisms above referred to, there is advantageously also provided at the display centre, particularly in the case where the invention is applied to a self-service store, a computer mechanism operable on the insertion of a card therein, when the items required to be registered thereon have been completed, to totalise the monetary recordings on the card and to print such total on the card. This computer mechanism is also, preferably, in communication with the storage station so as automatically to give a visible indication that a particular numbered card has been inserted therein and that no further items will be added to this particular numbered card.

A suitable manner in which the invention may be carried out in practice will now be described by way of example, as applied to the operation of a self-service store or supermarket, it being clearly understood that no limitation is intended thereby.

The store will be assumed to consist of two separated rooms of substantial area, one comprising the aforesaid display centre and the other, which may be located adjacent, or on a floor above or below, the display centre or at some distance therefrom, comprising the storage station or warehouse. The warehouse carries, on suitably stacked rows of shelves or cabinets, a plurality of each of a multiple variety of commodities, such as preserve jars, canned and frozen foods, cheeses, household articles and hardware such as are normally found in a well-stocked grocery and hardware store.

Also arranged at a suitable position in the warehouse is an indicating mechanism adapted to receive information transmitted from the other, or information-transmitting, room, as will appear hereinafter. This indicating mechanism consists of a wall panel carrying a plurality of groups of lamps, each group comprising sixteen lamps arranged in rows of four and the number of groups corresponding to the number of transmitting mechanisms in the warehouse. Above each group of lamps is placed a number, which corresponds to the stock number alotted to a particular commodity. Below the panel is placed a table or desk carrying a tape recorder for use by an assistant for a purpose hereinafter explained.

In the display centre or room, to which the purchasing public is to be admitted, are arranged a plurality of cabinets of the same size or of varying sizes, with each of which is associated an information-transmitting mechanism. Each cabinet carries visual particulars of a particular commodity stocked in the aforesaid warehouse, in the form of a printed card or preferably in the form of an actual sample of the commodity, such as a jar or jars of marmalade of a particular brand. The number of cabinets corresponds to the number of different varieties of commodities housed in the warehouse, and thus to the number of groups of lamps on the indicating panel.

Adjacent to, or integral with, each cabinet is a housing containing one of the aforesaid information-transmitting mechanisms. The housing contains a horizontally slidable frame or carrier on which are pivotally mounted on a transverse rod four spaced lever arms. The frame or carrier is provided with guide ways in which are slidably mounted four strips, each carrying four spaced metal contacts, and each strip being arranged for horizontal sliding movement in the plane of movement of one of the lever arms so as to be displaceable thereby. Each of the aforesaid contacts is electrically connected to one of the lamps of the group of lamps on the panel in the warehouse carrying the stock number of the pertaining commodity-exhibiting cabinet.

On the carrier or frame is also mounted, so as to extend transversely across the path of movement of the aforesaid slidable contact carrying strips, a further strip contact member, which is normally resiliently held out of contact with the said slidable strips, but which is adapted to be pressed into engagement therewith by the manual operation of a control lever pivotally mounted in the housing. The said transverse strip contact member is electrically connected to each lamp of the pertaining group of lamps on the warehouse panel, whereby actuation of the aforesaid control lever will make or break the electrical circuit through the said lamps. The control lever carries a stamp carrying particulars, of, and the price of, a commodity exhibited in the cabinet.

The above described mechanism is actuated, as will be explained hereafter, by the insertion horizontally into the housing of a card carrying a particular number, the leading edge of the card having cut therein one or more spaced slots, the number of which corresponds to the number of digits in the card number and the depth of which slot or slots is determined by the value or values of the digit or of the respective digits and the distance between the respective strip contacts in each set of contacts. By this means, on insertion of the card into the transmitting mechanism housing, one or more of the pivoted lever arms will be pivoted to move the associated slidable contact strip or strips to bring one or more contacts thereon into position beneath the aforesaid transverse contact member. Subsequent actuation of the control lever will move this transverse contact member downwardly into engagement with the contact or contacts located therebeneath, thereby closing the circuit through the pertaining lamp or lamps on the panel and giving to the warehouse assistant a visual indication of the number marked on the card.

One embodiment of the invention is illustrated in the attached drawings, in which:

FIGURE 1 is a plan view of one illustrative distribution center in accordance with this invention;

FIGURE 2 is a general view showing a display cabinet and adjacent information-transmitting mechanism housing and associated indicating panel for the embodiment of FIGURE 1;

FIGURE 3 is a sectional side view, drawn to a larger scale, of the housing shown in FIGURE 2 showing the information-transmitting mechanism housed therein;

Figure 4:
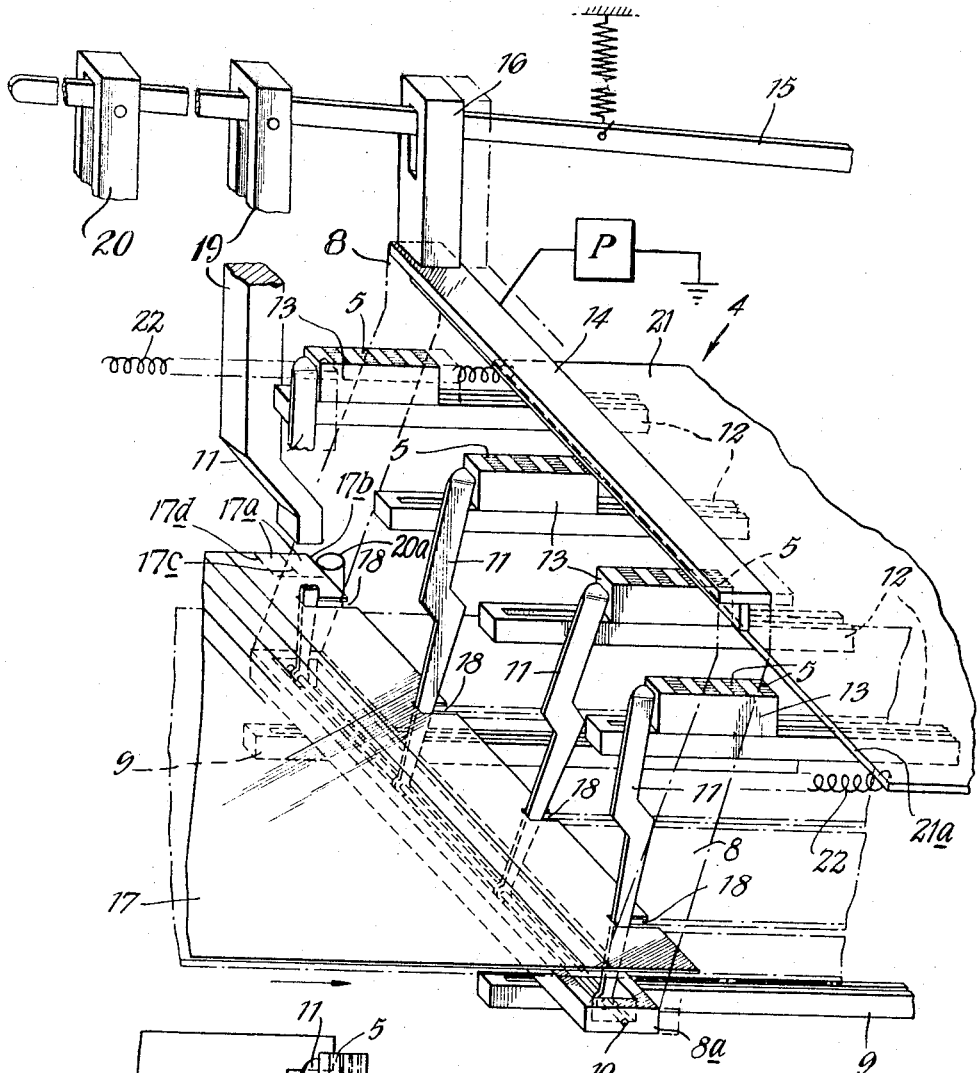
FIGURE 4 is a perspective view of the card actuated lever arms and associated sliding contacts of the transmitting mechanism shown in FIGURE 3.
Figure 5:
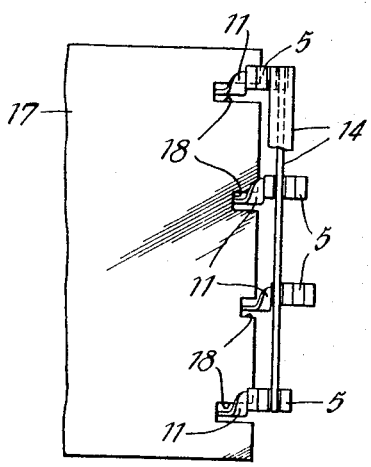
FIGURE 5 is a plan view of the card and card actuated lever arms shown in FIGURE 4.

In FIGURE 1 there is shown one illustrative embodiment of this invention which comprises a retail distribution center which is located on one floor and includes a storage area, a display area, and a dispatching area defined by appropriate walls separating different areas of floor space. In the display area, a plurality of display shelves D are provided to display samples of the merchandise on sale in the store, and adjacent to each sample of merchandise is an information transmitter which will be described later. Customers entering the store are given an order card containing slots which indicate a particular order number. The customer then walks through the display area and orders any desired combination of articles by inserting the order card into the information transmitter associated with the desired article. When the order card is inserted into the information transmitter, signals are transmitted to an information receiver in the storage area indicating both the order number and the article ordered. The appropriate articles are then removed by personnel in the storage area from storage shelves S and are placed on a conveyor belt for delivery to the dispatching area, along with an indication of the order number associated with each article so that they can be appropriately packaged at the dispatching area. Alternately, of course, the individual articles for each order may be held in the storage area and assembled together and conveyed as a unit to the dispatching area after the customer's order has been completed, as indicated by a special signal. In this particular example, however, a counter C and cash register R are provided in the display area for packaging the individual items according to their order number and totalling the price for each order. When the customer has completed his order, he takes his order card to the dispatching area, where his purchases are computed on the cash register and packaged together in the conventional manner. It will be apparent, of course, that numerous modifications can be made in the particular arrangement of the areas and functions according to the type of articles handled in the distribution center and the dimensions of the available space. In some instances, the storage area may be located on a different floor or even in a different building, and the orders may be packaged for delivery by a truck rather than hand delivery to the customer at the dispatching area. Also, in more refined embodiments of the invention, it may be desirable to provide means for automatically delivering each purchase on the order card and automatically totalling the price of an order in an automatic computer rather than on a manual cash register.

FIGURES 2 through 5 show the details of one illustrative information-transmitter and information-receiver of this invention. Referring to FIGURE 2, there is shown a cabinet 1 which carries a sample 2 of an article on sale in the store. Adjacent to cabinet 1 is a housing 3, in which an information-transmitting mechanism is mounted, as indicated generally by the numeral 4, and including a plurality of sets of electrical contacts 5, each of which is electrically connected to one of the series of lamps 6 mounted on a panel 7 located in the storage area. Each contact 5 is connected to one end of the corresponding lamp filament, and the other ends of the lamp filaments are connected to a common ground bus G. Although for the sake of clarity, the panel 7 has been shown as carrying a set of lamps 6 associated with only the mechanism 4 in housing 3, it will be understood that in practice, panel 7 will carry a plurality of sets of such lamps, each set being associated with a corresponding transmitting mechanism in the display area.

Referring to FIGURES 3 and 4, the transmitting mechanism 4 comprises an upstanding frame member 8 horizontally slidable at its base on guides 9 mounted in the housing 3. Base member 8 carries a transverse rod 10 on which are pivotally mounted four spaced lever arms 11. Longitudinally slidable on four spaced guideways 12, one associated with each of the levers 11, are four strip contact members 13. Each member 13 carries four spaced contacts 5, previously referred to, and is arranged for horizontal sliding movement in the plane of movement of the pertaining lever arm 11, by which it is adapted to be displaced. Each contact 5 is electrically connected, as illustrated in FIGURE 2, to one of the lamps 6 on the panel 7 in the storage area.

At the upper end of frame 8 is carried, so as to be vertically movable with respect thereto, a T-shaped contact strip 14 which extends transversely across the path of movement of the contact members 13. This contact strip 14 is normally held out of contact with the contact members 13 through the medium of a spring-controlled pivoted actuating lever 15 and a yoke 16 slidably carried by the lever 15. The strip 14 is electrically connected to a power source P so that when the lever arm 15 is swung downwardly, the contact strip 14 is brought into contact with whichever contact 5 of each set of contacts lies vertically therebeneath, thereby closing the electrical circuit through the particular lamp 6 on the panel 7 pertaining to the contacts 5. Upstanding frame member 8 and yoke 16 are made of an insulating material to prevent short-circuiting the power source P to ground. In the case where members 8 and 16 are made of conducting material, insulators must be provided between contact strip 14 and members 8 and 16.

17 denotes a card having cut in the leading edge thereof four slots 18 corresponding to a 4-figure card number, the depth of each slot being determined by the value of the particular digit of the card number to which the slot 18 pertains and also by the distance between the contacts 5 on the corresponding member 13. The distance between the slots 18 corresponds to the distance between lever arms 11, whereby, on insertion of the card 17 into the housing 3 through an opening 3a therein (FIGURE 3), each of the slots 18 in the card 17 will engage one of the lever arms 11. Further movement of the card 17 inwardly of the housing 3, up to a predetermined stop position, will cause each of the lever arms 11 to be swung around its pivot to an amount depending on the depth of the pertaining slot 18. Each lever arm 11 is thereby brought into contact with, and displaces, one of the contact carrying members 13, so as to bring one of the contacts 5 into position beneath the transverse contact strip 14, the lowering of which into contact with contacts 5, by means of actuating lever 15, will close the electrical circuit to the corresponding lamps 6 on the panel 7 and cause the lamps to light, thereby giving a visible indication of the number marked on the card 17.

A cutting device 19 is pivotally attached to the actuating lever 15 for cutting off the left hand corner of the leading edge of card 17, as indicated by the dotted rectangle 17a in FIGURE 4. A stamp 20 or other printing device is also attached to actuating lever 15 to mark the price or other information relating to the corresponding article on the card 17 when lever 15 is actuated. The left hand corner of card 17 normally engages a stop member 20a, which limits the movement of the card 17 within housing 3. Each time the card is inserted into a housing, however, a portion of the left hand corner is cut off as indicated by the dotted rectangles in FIGURE 4, so that the card will move further into the housing the next time it is inserted. This spaces the printing of the price of each successive article ordered with the card along the side of the card. It might appear that the change in depth of insertion of the card 17 would change the order number indicated thereby, but this is prevented by the slidable connection between upstanding frame member 8 and guides 9. As the card is inserted further into the housing, it merely displaces upstanding frame member 8 linearly, and since contact strip 14 is attached to upstanding frame member 8, it is displaced by the same amount. Therefore, the positioning of contact members 5 with respect to contact strip 14 is determined solely by the depth of slots 18 irrespective of how far the card 17 is inserted into housing 3.

After card 17 is withdrawn from the housing, the mechanism is reset by a strip member 21 which is slidable in guideways 12. The forward longitudinal edge 21a of strip member 21 engages the rear faces of contact members 13. Strip member 21 is connected to the front of housing 3 through tension springs 22. Thus, when the contact members are displaced inwardly of housing 3 by pivoted levers 11, as described above, the strip member 21 is also moved inwardly against the action of the retaining springs 22 to an extent governed by the further displaced contact member 13. On removal of the card 17 from the housing 3, the strip member 21 is moved forwardly under the action of its springs 22, thereby returning the contact members 13, the lever arms 11, and thereby the frame 8 to their initial position for reactuation when required.

The manner of use of the above described mechanism for the making of purchases in a self-service store will now be described.

A customer, on entering the display centre, first takes a card bearing a number, for example the number 132, and also three spaced slots on its leading edge, formed, as above described to represent, in the use of the card, the said number 132. The card is also marked with a series of spaced lines extending parallel to the leading edge of the card for the printing in the intervening spaces of particulars of a commodity desired to be purchased. It will be understood that the number on the card identifies this particular customer with any purchases made by the customer.

When the customer reaches a cabinet exhibiting a particular commodity, which it is desired to purchase, the customer inserts the card horizontally into the opening provided in the housing of the information-transmitting mechanism pertaining thereto, until the left-hand corner thereof contacts a stop in the housing.

This movement of the card has caused each of three of the lever arms in the housing to enter one of the slots provided in the card and to be swung around its pivot to an amount depending on the depth of the slot. Each of the said lever arms has, thus moved its associated contact strip to bring one of the contacts thereon into position beneath the aforesaid transverse contact member. The fourth lever arm has, of course, been moved by the uncut edge of the card to an extent to cause all the contacts on its associated contact strip to be displaced beyond the transverse contact member. The customer now actuates the control lever to move this transverse contact member downwardly into engagement with the contacts therebeneath to close the electrical circuit through the pertaining lamps of the group of lamps pertaining to this commodity cabinet, thereby giving to the assistant in the warehouse a visible indication of the number on the customer's card. The assistant is, thus, informed that a customer, identified by this number, desires to purchase a commodity shown in this particular cabinet. The assistant immediately records the customer's number and the stock number of the commodity in question onto a tape for eventual transmission to the warehouse staff, to collect the commodity or commodities itemised thereon and transfer it or them to a tray carrying the same number as that on the customer's card.

The customer then withdraws the card from the housing and passes on to the cabinet containing the next commodity required to be purchased. Here the customer repeats the above sequence of operations and the information thereby passed to the warehouse is acted on accordingly. The articles ordered by the customer are then conveyed to the dispatching area for delivery. It may here be mentioned that, in order to enable successive purchases to be correctly stamped on the card, in the successive spaces provided thereon, operation of the control member associated with each transmitting mechanism also cuts off the left hand corner of the leading edge of the card by an amount equal to the space between successive lines marked thereon. This enables the card, at each successive purchasing operation, to be inserted progressively further into the respective housing so as to allow for purchases already made and to enable the first unfilled space on the card to register beneath the printing mechanism.

When the customer's purchases have been completed, the customer inserts the card into a computing machine provided in the store, whereby the total cost of the various commodities marked thereon is computed and automatically stamped on the card. At the same time, operation of the computer causes an indication to be given to the warehouse that no further purchases will be effected with the use of this particular card number. The various commodities itemised are now collected and assembled on the tray bearing the customer's number, if they have not already been so assembled, and the tray passed to the dispatching centre to which the customer also proceeds and presents his or her card. After paying the total amount indicated on the card, the various purchases are handed to the customer and the transaction is completed.

It will, of course, be appreciated that, for the purpose of enabling the computing machine to carry out its function, it is necessary for perforations to be made in the card relative to each purchase stamped thereon. This function may suitably be effected by each information-transmitting mechanism as, and when, particulars of the purchase and the price thereof are stamped on the card.

Suitable facilities may be provided at each information-transmitting mechanism for recording the purchase of more than one item of a particular commodity and for this record to be transmitted to the warehouse. If, for convenience, a variety of makes and weights of the same commodity are exhibited in any one container, means is also advantageously provided for recording the particular make and weight of the commodity chosen by the customer. Also, should the customer change his or her mind and wish to cancel the record of any particular purchase, means may be provided for recording such a cancellation on the card and for informing the warehouse accordingly, such as by the lighting of an additional lamp provided on the panel for this purpose.

Although, in the above, one example of the manner in which the invention may be carried out has been described, it will be understood that modifications may be made thereto without departing from the scope of the invention. For example, the information appearing on the lamp panel in the warehouse need not be manually recorded as above described, but may be automatically recorded by a teleprinter mechanism. Furthermore, means may, if desired, be provided in the warehouse for automatically assembling a customer's indicated purchases and transferring them to the reception centre.

It is also within the purview of the invention to provide additional mechanism actuatable by the information-transmitting mechanism at any cabinet for automatically making a complete record of all purchases made from this cabinet during any day or any part of a day during which the store is open and, in addition, mechanism for automatically recording any additions to the stock of a particular commodity in the warehouse and the amount of stock available and its total value at any given time.

Again, if desired, the indicating mechanism at the storage centre or warehouse may be operated mechanically instead of electrically.

What I claim is:

1. A distribution center for receiving, storing and distributing articles comprising a storage area for storing a plurality of different articles, a display area containing displays of the articles in the storage area, a plurality of individual means in the storage area each representing an individual article on display in the display area, a plurality of individual means in the display area for generating a purchaser identification signal in relationship to a selected article, circuit means connecting each of the individual representing means in the storage area with an associated one of the individual signal generating means, said circuit means being effective to transmit the purchaser identification signal from any one of the signal generating means to its associated representing means, and said representing means in said storage area includes means for identifying both the selected article and its purchaser signal.

2. The distribution center as defined in claim 1 wherein each of said signal generating means includes means responsive to a coded card incident to the generation of a particular purchaser identification signal by any one of the plurality of individual signal generating means.

3. The distribution center as defined in claim 1 wherein each of said signal generating means includes means responsive to a perforated card incident to the generation of a particular purchaser identification signal by any one of the plurality of individual signal generating means.

4. The distribution center as defined in claim 1 wherein each of said signal generating means includes means responsive to slots in an edge of a card incident to the generation of a particular purchaser identification signal by any one of the plurality of individual signal generating means.

5. The distribution center as defined in claim 1 wherein each of said signal generating means includes means responsive to slots in an edge of a card incident to the generation of a particular purchaser identification signal by any one of the plurality of individual signal generating means, said responsive means include a plurality of movable members adapted to be moved predetermined distances as determined by the depth of the slots in a particular card, and said signal generating means include means for translating the movement of said movable members into a particular purchaser identification signal.

6. The distribution center as defined in claim 5 wherein said movable members are a plurality of pivotally mounted lever arms.

7. The distribution center as defined in claim 5 wherein said movable members are a plurality of pivotally mounted lever arms, electrical contacts associated with each of said lever arms for actuation thereby, and means mounting said lever arms and contacts for sliding movement.

8. The distribution center as defined in claim 7 wherein each of said representing means includes an indicating mechanism defined by a plurality of groups of lamps corresponding to the number of signal generating means, and said circuit means connects each lamp of one of the representing means to one of the contacts of the signal generating means.

9. The distribution center as defined in claim 8 wherein each group of lamps is formed of a plurality of rows of lamps, and the number of rows of lamps and the number of lamps in each row corresponds respectively to the number of lever arms and the number of contacts of an associated signal generating means.

10. The distribution center as defined in claim 1 including means for conveying selected articles from said storage area to a dispatching area.

11. The distribution center as defined in claim 1 including means associated with each signal generating means for marking information on a card adapted to initiate the generation of a particular purchaser identification signal.

12. The distribution center as defined in claim 1 wherein said circuit means includes a plurality of movable members mounted in spaced parallel relation to each other, a plurality of separate mutually insulated electrical contacts attached in spaced relation to each of said movable members along the line of movement thereof, a signal actuating member extending transverse to said movable members adjacent to said electrical contacts, means on said signal actuating member for contacting one electrical contact on each of said movable members when moved into contact therewith, means coupling each of said electrical contacts with an associated indicator means of said representative means, and means for moving said signal actuating member into contact with said movable members to generate a particular purchaser identification signal dependent upon the particular movement of the movable members.

13. The distribution center as defined in claim 12 including a plurality of indicator lamps each coupled between a corresponding one of said electrical contacts and a terminal of a power source, and said signal actuating member being coupled to the other end of said power source.

References Cited

UNITED STATES PATENTS

| | | | |
|---|---|---|---|
| 1,408,679 | 3/1922 | Ball | 186—1 |
| 1,461,613 | 7/1923 | Gilbert. | |
| 1,625,490 | 4/1927 | Morris | 186—1 |
| 2,127,769 | 8/1938 | Esgro. | |
| 2,166,194 | 7/1939 | Roman | 340—324 X |
| 2,276,111 | 3/1942 | Spears. | |
| 2,536,155 | 1/1951 | Brand | 186—1 |
| 2,661,682 | 12/1953 | Saunders | 186—1 X |

SAMUEL F. COLEMAN, *Primary Examiner.*